United States Patent
Zhan et al.

(10) Patent No.: US 11,775,622 B2
(45) Date of Patent: Oct. 3, 2023

(54) ACCOUNT MONITORING

(71) Applicant: ForeScout Technologies, Inc., San Jose, CA (US)

(72) Inventors: Chunhui Zhan, Fremont, CA (US); Siying Yang, Fremont, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 235 days.

(21) Appl. No.: 17/129,454

(22) Filed: Dec. 21, 2020

(65) Prior Publication Data

US 2021/0264004 A1 Aug. 26, 2021

Related U.S. Application Data

(63) Continuation of application No. 15/598,207, filed on May 17, 2017, now Pat. No. 10,885,165.

(51) Int. Cl.
| | |
|---|---|
| G06F 21/31 | (2013.01) |
| H04L 9/40 | (2022.01) |
| G06F 21/55 | (2013.01) |
| G06F 21/45 | (2013.01) |
| H04W 12/61 | (2021.01) |
| H04W 12/63 | (2021.01) |

(52) U.S. Cl.
CPC ............ *G06F 21/316* (2013.01); *G06F 21/45* (2013.01); *G06F 21/554* (2013.01); *H04L 63/10* (2013.01); *H04L 63/102* (2013.01); *H04L 63/105* (2013.01); *H04L 63/1408* (2013.01); *H04L 63/1416* (2013.01); *H04L 63/1425* (2013.01); *G06F 2221/2111* (2013.01); *G06F 2221/2151* (2013.01); *H04L 63/0272* (2013.01); *H04W 12/61* (2021.01); *H04W 12/63* (2021.01)

(58) Field of Classification Search
CPC .................. G06F 21/316; G06F 21/45; G06F 2221/2151; G06F 2221/2111; H04L 63/10; H04L 63/0271
USPC ........................................................ 726/2, 7
See application file for complete search history.

(56) References Cited

U.S. PATENT DOCUMENTS

| | | | | |
|---|---|---|---|---|
| 7,908,645 | B2 * | 3/2011 | Varghese | G06F 21/552 715/833 |
| 9,148,424 | B1 * | 9/2015 | Yang | H04L 63/083 |
| 9,699,203 | B1 * | 7/2017 | Yang | H04L 63/308 |
| 10,061,936 | B1 * | 8/2018 | Burger | H04L 63/1441 |
| 10,223,524 | B1 * | 3/2019 | Kane-Parry | G06F 21/46 |
| 10,681,060 | B2 * | 6/2020 | Scheidler | G06N 20/00 |
| 2004/0054929 | A1 * | 3/2004 | Serpa | G06F 21/31 726/5 |
| 2008/0162338 | A1 * | 7/2008 | Samuels | G06Q 20/40 705/42 |
| 2010/0263055 | A1 * | 10/2010 | Habif | 726/27 |
| 2012/0297484 | A1 | 11/2012 | Srivastava | |

(Continued)

OTHER PUBLICATIONS

Int'l Search Report and Written Opinion of the ISA/EP in PCT/US2018/033022 dated Jul. 24, 2018; 12 pgs.

*Primary Examiner* — Samson B Lemma
(74) *Attorney, Agent, or Firm* — Womble Bond Dickinson (US) LLP

(57) ABSTRACT

Systems, methods, and related technologies for account access monitoring are described. In certain aspects, a login request associated with a device can be analyzed and a score determined. The score and a threshold can be used to determine whether to initiate an action.

19 Claims, 5 Drawing Sheets

(56) References Cited

U.S. PATENT DOCUMENTS

| | | | |
|---|---|---|---|
| 2013/0340052 A1* | 12/2013 | Jakobsson | G06Q 20/4016 |
| | | | 726/5 |
| 2014/0181968 A1* | 6/2014 | Ge | H04L 63/1416 |
| | | | 726/23 |
| 2016/0105801 A1* | 4/2016 | Wittenberg | H04W 4/029 |
| | | | 455/411 |
| 2016/0210450 A1* | 7/2016 | Su | G06F 21/552 |
| 2017/0214679 A1* | 7/2017 | Lin | H04L 63/083 |
| 2019/0245839 A1* | 8/2019 | Cox | H04L 63/0853 |

\* cited by examiner

| Account | IP Address | Context Name Location | Account Access Result | Duration | Resources Accessed | Security Posture | Password Change |
|---|---|---|---|---|---|---|---|
| User1 | 10.10.1.100 | 10.10.1.x Dept: Accounting SubDept: Accounts Payable | 1: Success 2: Failure 3: Success | 1/1/00 9:04.06 – 1/1/00 17:30.15 ⋮ | Accounting Drive AP Drive ⋮ | Device Info | 1 time ⋮ |
| User2 | 10.10.10.102 | 10.10.10.x Dept: Sales SubDept: Conference Room | 1: Failure 2: Failure 3: Success | ⋮ | ⋮ | ⋮ | ⋮ |
| ⋮ | ⋮ | ⋮ | ⋮ | ⋮ | ⋮ | ⋮ | ⋮ |

Fig. 2

ACCOUNT MONITORING

CROSS-REFERENCE TO RELATED APPLICATIONS

This application is a continuation of U.S. patent application Ser. No. 15/598,207, filed May 17, 2017, now U.S. Pat. No. 10,885,165, issued on Jan. 5, 2021, the entire contents of which are hereby incorporated by reference.

TECHNICAL FIELD

Aspects and implementations of the present disclosure relate to account monitoring, and more specifically, to account access monitoring based on information available via a communication network.

BACKGROUND

Organizations often protect sensitive and privileged accounts from hijacking by limiting their access to internal private networks. This may handle account hijacking from outside the private network but does not prevent insiders and compromised devices on the private network from accessing the accounts. Insiders and compromised devices may thus pose a significant security risk to private networks. The private networks can be networks not open to the public including corporate networks, campus networks, data center networks, virtual private networks in a cloud, etc.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts an exemplary data structure operable for use in monitoring account access in accordance with aspects and implementations of the present disclosure.

DETAILED DESCRIPTION

Figure 1:
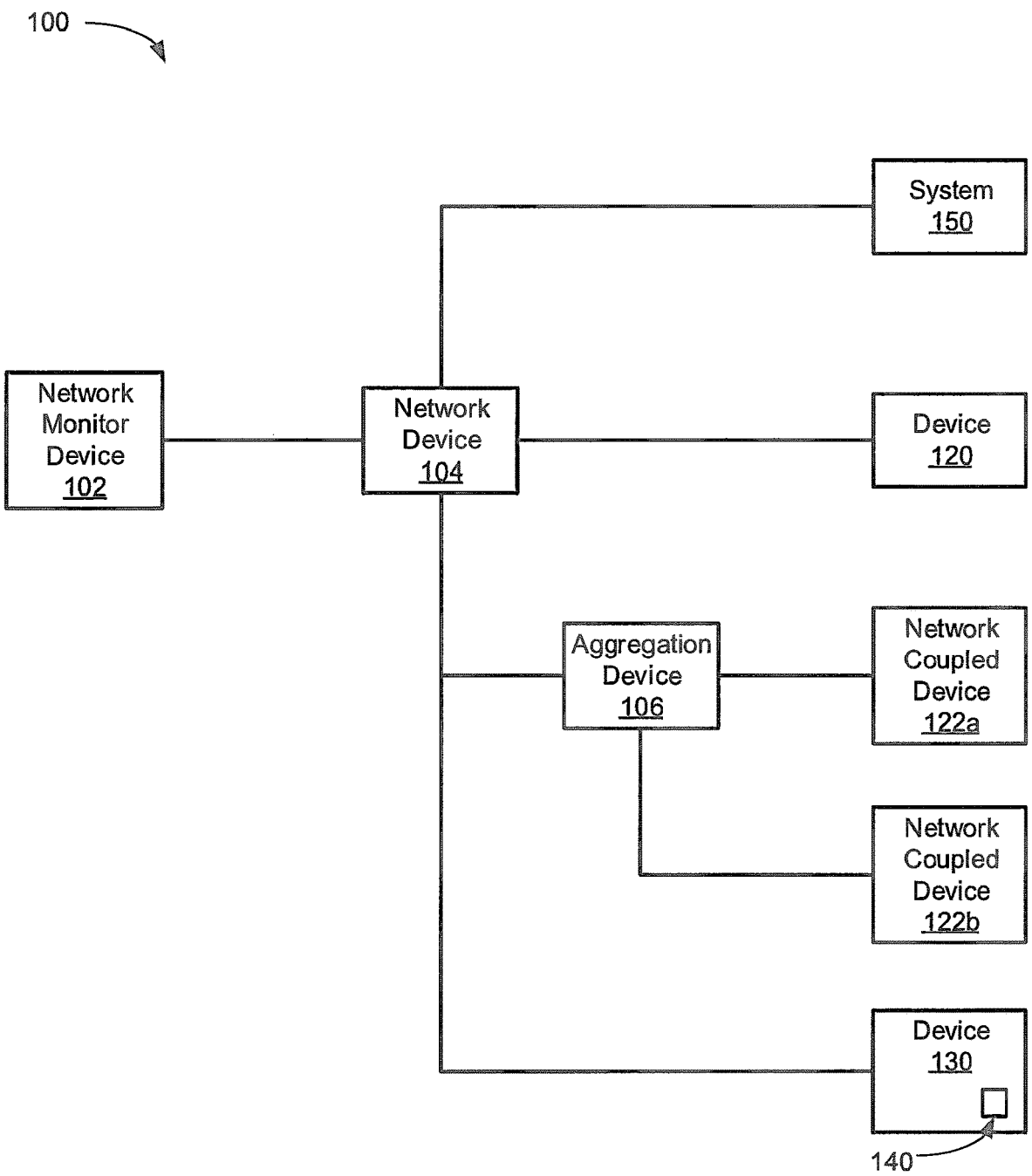
FIG. 1 depicts an illustrative communication network in accordance with one implementation of the present disclosure.

Aspects and implementations of the present disclosure are directed to account monitoring. The systems and methods disclosed can be employed with respect to network security, among other fields. More particularly, it can be appreciated that access to network resources by unauthorized devices or users is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of account access activity, detecting account compromise, and provide the ability to control access to network resources (e.g., by defining and employing access policies which dictate the response to various types of account behavior that are or are not authorized to access certain network resources, the circumstances under which such access is or is not permitted, etc.).

Existing methodologies may rely on strong password policies. Existing methodologies may further rely on firewall policy segmentation where portions of a network are segmented from other parts of the network by a firewall and particular accounts are restricted to accessing particular resources of particular network segments. For example, user account credentials with access to a database can be blocked from access the database with a device in a particular network segment by a firewall policy. The user has credentials but the firewall segmentation blocks access to the database.

However, a firewall policy will not be able to prevent account access for accounts that are allowed to access a particular network segment. Some portions of the network or devices will have access to the accounts allowed to access a particular network segment. This does not prevent a malicious program, e.g., malware or an insider threat program, from getting access to an allowed network segment. Further, a malicious user may not be prevented from gaining access if he or she is using a device allowed to access a particular network segment. Firewall segmentation does not prevent these problems.

Other existing methodologies are log or security information and event management (STEM) based systems which collect logs and analyze behavior. These systems can report when a single event is considered abnormal. These methodologies frequently have false positives because user account access patterns can change frequently. For example, a user may access an account for the first time at 3:00 AM in the morning which is abnormal based on past behavior but may be legitimate access because the use is working on an important project with an upcoming deadline. Other existing methodologies may separately quarantine a device based on a memory dump, e.g., malware memory dump, or an indicator of compromise (IOC). Existing methodologies thus are not able to prevent malware or insiders from accessing accounts from some segments of private networks.

An IOC is an artifact (e.g., observed on a network or in an operating system) that with a high confidence indicates a computer intrusion. IOCs may include virus signatures, internet protocol (IP) addresses, MD5 hashes of malware files, uniform resource locators (URLs), domain names of botnet command and control servers, unusual network traffic, unusual privileged user account activity, login anomalies, increases in database read volume, suspicious registry or system file changes, unusual domain name system (DNS) requests and Web traffic showing non-human behavior.

Embodiments can include a network monitor device operable to gather account rich-context access information including network addresses and mappings, device properties, one or more security properties or security posture (e.g., operating system (OS), applications present, running, or both, vulnerabilities, patch level, etc.), account access pattern, and create a baseline of normal user behavior on one or more accounts. The information gathering process may include communicating with servers hosting the accounts and monitoring network traffic. This can allow for reliable detection of account compromises or hijacking attacks on a network (e.g., private network).

Embodiments may further gather information from external (e.g., third party) systems including firewall and STEM systems. Embodiments are thus able to access or observe the account flow in a network. Abnormal account access behavior can be detected and correlated with network information to provide more accurate account monitoring and reporting. For example, an indicator of compromise (IOC) associated with a device and an abnormal login request to a sensitive database may be blocked or reported to an information technology (IT) administrator or IT ticketing system. The device may further be inspected or probed for vulnerabilities or other risk associated behavior. As another example, if there is an IOC associated with a device and one or more packets are observed along with an abnormal connection (e.g., to a suspicious external server), this can be used to increase the accuracy of reporting and performing security measures in response to suspicious account behavior.

Embodiments can track account access activity to determine historical or baseline account access activity which can then be compared against future account access behavior and other factors to determine whether an action (e.g., notification or security action) should be performed. The other factors or device properties can include IOC, software versions of a device (e.g., patch versions), updates present on a device, information based on packets sent to and from a device (e.g., accessed based on observing network traffic), etc.

Network device context, e.g., including a location of a device initiating a login, can be correlated with new account access behavior to determine whether an action should be performed. The network device context information can be used to reduce false positives for identifying suspicious account access behavior thereby enabling more accurate, proper, and effective security policy implementation.

Embodiments of the present disclosure provide reliable account access monitoring and reporting techniques in a more accurate and fine-grained manner (e.g., based on multiple factors including device location, network traffic analysis, etc.). The account reporting can including reporting of suspicious account behavior based on multiple pieces of information thereby providing more reliable and accurate (e.g., reduced false positives) account compromise reporting than current methodologies.

Accordingly, described herein in various implementations are systems, methods, techniques, and related technologies, which enable account access monitoring and performing action (e.g., one or more notification actions or security actions) based on abnormal account access behavior. As described herein, various pieces of information can be collected from network devices and network traffic to provide context information for tracking account access.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

In some embodiments, additional sources of device information may be used to increase account access context information and accuracy about account behavior reporting. If an agent is present on the device (e.g., a personal computer (PC) or server), the agent can collect and provide detailed account access information (e.g., local account access). If an agent is not present, e.g., on a mobile device, data from other systems, e.g., a vulnerability assessment (VA) system, an advanced threat detection (ATD) system, a mobile device management (MDM) system, a firewall (FW) system, a switch system, and an access point (AP) system can be used to gather additional information.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including monitoring of account access, including login requests, and granting or denying account access or changing network access of a device based on login behavior (e.g., suspicious behavior including repeated login failures combined with an IOC). Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring) and monitor account access.

The monitoring of account access by network monitor device 102 may be based on a combination of one or more pieces of information including traffic analysis, information from external or remote systems (e.g., system 150), information from an agent (e.g., agent 140), communication (e.g., querying) an aggregation device (e.g., aggregation device 106), and querying the device itself, which are described further herein. Network monitor device 102 may be operable to use one or more application programming interfaces (APIs) to communicate with aggregation device 106, device 120, device 130, or system 150.

Network monitor device 102 may be operable to monitor or track account access to determine a baseline or normal account access activity. This baseline activity can then be used to determine whether a new account access attempt is abnormal. The determination of baseline activity and analysis of new account access attempts can be based on accessing logs, STEM systems, and network traffic (e.g., based on packet analysis of packets associated with one or more login requests). Network monitor device 102 can determine a score based on one or more pieces of information associated with a new login request, previous logins, and previous login attempts. The score may then be compared against a threshold to determine whether or not to initiate an action (e.g., recording the event, an alert or notification action or a security action including changing network access for a device). Network monitor device 102 thus can use multiple pieces of information to more accurately report and act upon account compromises or hijacking.

Network monitor device 102 can generate an account access location map that maps a physical location to an IP address. Each IP address may be given a physical location label. Network monitor device 102 can define fine-granular network segments based on IP addresses and subnets, with overlapping IP addresses appropriately treated to reflect their physical locations in private networks. For example, the physical locations may include department (e.g., accounting, accounts payable, engineering, quality assurance, etc.), sub department, cube, desk, room (e.g., conference room, cafeteria, lobby, etc.). When a user logins in, accesses, and logs out of an account from a particular device, those events can be recorded in the account access map. Over time, an account access map, having location and login information, for each particular account is created and stored. An example data structure 200 of a location access map is shown in FIG. 2. The information of the location access map can be used to increase the accuracy of account hijack detection.

Network monitor device 102 can add device context information to the account access map. Information added to the account access map (e.g., based on network access control (NAC) functionality) can include login time (e.g., 8:59 AM), access duration (e.g., 9 AM-5 PM), logout time (e.g., 5:06 PM), and device properties (e.g., one or more security properties or security posture including operating system (OS), applications present, running, or both, vulnerabilities, etc.). This can make the account access map multi-dimensional.

Network monitor device 120 may further detect account access behavior through network monitoring (e.g., human login vs. computer program login). Human users initiate access to an account by typing the user name and password. Computer programs can access account with much higher speed (e.g., when logging in a user through a single sign on (SSO) system). The speed with which a human enters a login and password will be relatively slow as compared to a computer entering the information. The intervals between the key presses by a human will not be consistent. It is appreciated that in many networks there may be legitimate logins to accounts that are from a human and from a computer. Where someone logins in with a single sign on system, the computer program triggers the sign by a computer.

For example, except for devices of a single sign on system, if a computer program is observed accessing an account from a new device, it may likely be an attack. An inference can be made as to whether it is human or a computer program accessing the account based on heuristics with network traffic sniffing. Network monitor device 102 may determine the duration of the login process, which can involve several packet level transactions between the client and the server. With a clear text login, the packets of the communication can be parsed to determine the start point and end point of the transaction (e.g., associated with logging in). For example, if an account is accessed through a clear-text protocol, network monitor device 102 can parse the protocol directly to determine the login process duration.

If an account is accessed through an encrypted protocol (e.g., secure socket layer (SSL)), network monitor device can apply heuristics to infer the login process duration, e.g., usually several packets after the SSL handshake completion corresponding to the login process. This duration information can be used to determine human account access or computer account access.

For an encrypted connection, once the connection is encrypted, typically the first transaction will be a login transaction, several seconds after the handshake. Embodiments can estimate how long the login takes based on the communication of several small packets between the client and server. For example, after the handshake and establishment of the secure connection, the next five packets may be treated as login packets to determine the login duration. This can be based on the fact that transactions after login are generally larger in terms of data (and packet size) (e.g., a file download or upload) and there are typically more transactions after login. In some embodiments, the duration of the login is estimated based one or more small packets after establishing of a connection.

This can further be based on the fact that protocols are well structured. Secure socket layer (SSL) and hypertext transfer protocol secure (HTTPS) can be used for login and subsequent communication. Based on the structure of the protocols, the size of the SSL or HTTP header can be subtracted from the packet size to determine the payload size. The login duration may be estimated based on one or more packets with a relatively small payload after a connection is established. The username and password can also be part of the URL arguments or if another transaction type, the username and password can be part of the HTTP body. In both cases, the transaction size will be a relatively small (e.g., as compared to subsequent transactions).

For Windows™ environments with SSO, SSL, and Kerbos may be used to login to a domain (e.g., Active Directory™). Malware may use PowerShell™ or Windows™ Management Instrumentation (WMI) scripts to spread. The using of PowerShell™ (e.g., by malware or by an administrator or SSO) can make it difficult to use a human versus device login as a sole indicator of whether an account has been hijacked. However, when combined with other indicators (e.g., IOC, recent password change, multiple login failures at one or more devices), the accuracy of determining of the whether an account has been compromised or hijacked is increased.

Embodiments may thus determine (and maintain) a baseline of account access including whether the account is usually accessed through a human login, a computer program login, or a combination thereof. For example, if an account is normally logged in at a particular time of day by a computer program and then a human is observed logging into the account, that event can be flagged or recorded, and an action may be initiated, as described herein. The reverse could also occur where a human logs in relatively quickly and a computer logs in relatively slowly.

Login failures may also be recorded and stored to be used as an indicator of account compromise and combined with other indicators to determine if an account has been compromised, as described herein. If a hacker is attempting to log into an account and there is a sudden increase in failures associated with the account, this can suggest that an attack is occurring. The time of the login failures may be compared with the baseline access time pattern. If the time is not within the normal access time pattern (e.g., at 2:30 AM for an employee who typically works 9 AM to 5 PM), this may be combined with the sudden increase in login failures to determine that a security action is to be performed (e.g., possibly restricting network access of the device initiating the login requests).

Network monitor device 102 can use a baseline account access model and detection of access anomalies through policy or statistic learning. Based on the account access map with contextual information and account access behavior as recorded or observed, a baseline for account access patterns can be created for each account. Using the above information as input, anomalies can be detected, e.g., from policies or through statistic learning. For example, new or future behavior can be compared to past or previous behavior to determine if the new behavior is abnormal or anomalous. New behavior may be recorded (e.g., added to the location access map) to update the baseline account access pattern information.

For example, if a user John logs in each weekday at approximately 9 AM and logs out at approximately 5 PM on a typical work days (e.g., excluding holidays) and the login processes takes approximately 3-4 seconds, when John logins in at 3 AM, it can be compared to previous login information. A security policy may then be accessed to determine what, if any, action is to be taken. An IT ticket may be sent based on the anomalous login time or if the policy may be configured such that a single irregular time login is recorded but not made part of a notification.

An example policy can include conditions such that it is acceptable or treated as normal if an employee works in an office that he or she can log into one or more accounts during day from a cube or conference room. The policy may further allow logging in from the employee's home or outside the office to the same accounts at night in the same time zone of the office. The policy may further flag a login from a conference room at night as an anomaly that is outside the employee's based work hours. The login may be recorded as anomalous, be part of a notification, or a combination thereof. In cases where the policy records the anomalous login, the login may still be allowed.

The policy may also allow a login at 3 AM by a computer into the account, without notifying the IT department. This may be based on the fact that the user associated with the account may be traveling (e.g., based on a calendar indicating that the user is working out of the office or a meeting at a remote branch office).

For example under the policy, if a subsequent login attempt is made from a different device and fails, then a flag may be recorded and a notification sent (e.g., an IT ticket). If the user John logs in with his laptop through virtual private network (VPN) to the corporate network, that will be allowed and may not be flagged. John may normally access an engineering drive (e.g., for a code deposit) and a quality assurance drive (e.g., for testing), under the policy two login failures may be compared with how recent a password change was made and determined to be acceptable (e.g., no flag recorded). If John's account is used for an attempted login to a human resources drive or a finance drive (which he has not accessed before), the login requests may be recorded and a notification sent to IT.

A security action may also be performed if malware is detected on a device or some other IOC associated with the device or if some unknown process is running on the device that originates a login request. A security action may then be initiated and the IT department notified. A policy may thus trigger notification, a security action, or combination thereof based on several events or conditions (e.g., login requests from a new location, IOC, login failures, login request to new resources, login requests at abnormal times, etc.).

Embodiments advantageously are able to incorporate context, including location information, when determining whether login behavior is abnormal. Embodiments are able to use a new login request as a starting point for correlating multiple factors thereby resulting in more accurate reporting of account compromises instead of false positives. For example, several events, characteristics, or combination thereof that individually may not be sufficient to invoke a security action of a policy when considered together may be sufficient to invoke the security action of the policy. As another example, additional or newly received information may be combined with previously recorded events, characteristics, or a combination thereof to accumulate more attach information to make an account compromise determination. In contrast, current methodologies are limited to account and IP address information and report false positives upon a user logging into a resource for the first time.

Embodiments can further incorporate packet analysis information. Account access behavior may be correlated with network traffic based on output from a packet analysis component (e.g., packet engine or traffic analyzer 408). Abnormal behavior of account access may be correlated with abnormal network traffic from a device to determine that a security action should be taken. For example, several login failures alone may not invoke a security action but when combined with information that the device is sending out multiple packets to (abnormally) probe other devices on the network, this can be sufficient to initiate a security action (e.g., quarantine the device based on the policy).

Information from one or more external or $3^{rd}$ party systems (e.g., system 150) may further be used in determining whether to perform an action (e.g., a notification action or a security action). For example, an employee may be working different than normal hours or forget his password resulting in a login failure, these events may not be enough for security action. However, if it is determined that the login is blocked by a firewall, the firewall information may be correlated with the different hours and the login failure to perform a security action. Also, if an anti-malware or anti-virus scan is initiated on the device that is originating the login requests, information of the scan may be received from a system that initiated the scan and correlated with the abnormal access time and one or more login failures to initiate a security action.

In some embodiments, the security action may include signaling other systems to perform various functions. For example, a firewall may be signaled to restrict access of a device to one or more portions of the network. An anti-malware scan or anti-virus can may be initiated on the device prior sending a notification (e.g., the notification may be conditional on either of the scans finding malware or a virus).

Embodiments can further support use of statistical learning or machine learning, e.g., in place of explicit policy rules or in combination with explicit policy rules. For example, the machine learning may be used with a collected baseline of account activity (e.g., data structure 200) to determine when and whether to perform security actions. For example, a model may be trained based on baseline data gathered during a two week period of recording account access behavior and once trained the model may be used to determine whether to send a notification, perform a security action, or combination thereof. It is noted that the model may further use data based on packet analysis, external systems (e.g., $3^{rd}$ party systems) such as, for example a firewall, a threat detection systems, etc.

For example, an account-hijacking malware that manages to compromise a device in a data center and makes lateral moves across network segments in the data center may have multiple login failures. The malware may have the multiple failures as it tries to move across network segments or may hijack other accounts such that a device is for the first time being used with multiple accounts. When the malware accesses the account from different locations as compared to the account access map, as described herein, the anomalous behavior can be detected and the attack isolated or stopped. This may be performed automatically (e.g., based on machine learning) or with a human configured account access policy.

If a login failure is consistent with a user's normal failure pattern, then this may not be enough to trigger a security action. However, the login failures may be correlated with other behavior, e.g., an indicator of compromise (IOC) or attempted failure to access to a resource that has not been accessed with that account previously. For example, a user normally accesses a human resources network drive without login failures and has not previously attempted to access any finance network drives. If there is a login failure attempting to access the human resources drive and a login failure attempting to access the finance network drive, this information can be correlated and acted upon based on a policy (e.g., restricting network access of the device used to initiate the failed login attempts). The action of policy may be based on the correlation of the location map and the failures, where the location map (e.g., data structure 200) includes a baseline of the resources accessed by the user.

Login failures can further be considered with whether it is a human login or a computer login. It is appreciated that humans may make typographical errors while computer programs if they are legitimate, should not have login failures due to typographical errors but will if the computer program is trying to guess a password. If an account is regularly accessed by a computer and suddenly has login failures that might could be a sign of a security compromise and may be recorded and combined with other indicators, as described herein.

Indicators of compromise (IOC) can be raised by device detection or firewall systems. In some embodiments, the location access map may further include IOC information, where available, for each IP address. An IOC can be used in analyzing whether a login access request is suspicious and thereby warrant a security action. For example, if a device has an associated IOC and is observed making login access failures or is observed attempting to access resources that have not been previously accessed, a determination can be made that the account has compromised with a high degree of certainty and low risk of reporting a false positive. The network access of the device may also be restricted.

For example, if malware has been detected running on a device and another device is in communication with the device running the malware over a different connection (e.g., Bluetooth), this information can be correlated with other behavior when a login request is made by the device in communication with the device executing the malware. The information can be a strong indicator that an account has been compromised and an action may be performed.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity (e.g., location account accesses including logins), etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140.

System 150 may be external, remote, or third party system (e.g., separate) from network monitor device 102 and may have information about devices 120 and 130 and network coupled devices 122a-b. System 150 may be a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other IOC.

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor 102.

The advanced thread detection (ATD) or thread detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for account access monitoring by network monitor device 102.

The firewall (FW) system may be configured to monitor and control incoming and outgoing network traffic based on security rules. The FW system may provide information about a device being monitored including attempts to violate security rules (e.g., unpermitted account access across segments) and network traffic of the device being monitored for account access.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used monitor account access and control network access of one or more devices. The switch or AP system may have one or more interfaces for communicating with IoT devices or other devices (e.g., ZigBee™, Bluetooth™, etc.), as described herein. The VA system, ATD system, and FW system may thus be accessed to get vulnerabilities, threats, and user information of the device to be identified in real-time which can then be used to determine whether an account has been compromised.

Aggregation device 106 may be configured to communicate with network coupled devices 122a-b and provide network access to network coupled devices 122a-b. Aggregation device 106 may further be configured to provide information (e.g., operating system, device names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the type of devices on the network do not change often).

FIG. 2 depicts an exemplary data structure 200 operable for use in monitoring account access in accordance with aspects and implementations of the present disclosure. Example data structure 200 may be a matrix, table, or other multi-dimensional data structure. Data structure 200 can be used to store account access information and determine when login behavior is abnormal. In some embodiments, the information of data structure 200 can be correlated with device behavior (e.g., based on packet analysis) and data from other systems (e.g., external or 3rd party systems) that provide security information (e.g., IOC). The correlation of the information of data structure 200 with information from other sources can be used to improve the accuracy of the account compromise or hijack detection.

Example data structure 200 includes account column 206, IP address column 208, context name location column 210, account access result 212, duration column 214, resources accessed column 216, security posture column 218, and password change column 220. Example data structure 200 is an example data structure that may be used by some embodiments to store values for tracking account access, establishing a baseline, and identifying abnormal account access activity.

Account column 206 can be used to store an account name of an account and whether the account is local (e.g., local to a device) or a network account (e.g., a domain account).

IP address column 208 can be used to store one or more IP addresses of a device that requested access to an account (e.g., of account column 206). For example, IP address column 208 may have an IP address of a device associated with each login request (e.g., including login successes and failures). The IP address column 208 of the data structure 200 may be a unique key for accessing data of the data structure 200 (e.g., due to an IP address of a device being unique at the time of an account access request). For example, User1 can log into a domain controller from a device and the IP address of the device can be stored in IP address column 208 as shown in row 230. It is appreciated that various embodiments may support tracking devices with the other identifiers in place of an IP address.

Row 230 stores information associated with the account of User 1 and associated with the device with IP address of 10.10.1.100. Row 240 stores information associated with the account of User2 and associated with the device with IP address 10.10.10.102. A new row of data structure 200 may be created for each IP address for each account access attempt. For example, an additional row can be used to store information for when the User1 account is used to log into the network from another device. Thus, there may be a row created in data structure 200 for each login request or attempt.

Context name location column 210 can be used to store context information associated with account access (e.g., account access requests or login requests) including network information and physical location information. The network information of a device associated with the account (e.g., in account column 206) can include a subnet (e.g., 1.1.1.x). For example, an engineering, quality assurance, or finance network subnet can be stored as 1.1.1.x. The physical location information can include department (e.g., accounting), sub department (e.g., accounts payable (AP)), cube, and desk, etc. The physical location information may be determined based on manually entered information (e.g., associated with a network switch) or based on a physical connection (e.g., Ethernet) where the device is coupled to a network device (e.g., switch or wireless access point). A NAC device may have access to network topography and physical location information and can set values of the context name location 210.

Account access result column 212 can be used to store account access results including success or failure. In some embodiments, a percentage of login failures associated with each account and device IP address may be stored. The data of the account access result column 212 can be used as an indicator of whether an account has been compromised. For example, if an account suddenly has lots of account access failures from abnormal locations (e.g., not before observed), a security action may be performed (e.g., a notification sent, network access of a device changed, a combination thereof, etc.) or the number of failures may be considered in conjunction with other factors, as described herein.

Duration column 214 can be used to store timestamps of when device is logged into and logged out of a particular account and thereby store the login duration. For example, row 230 has a login timestamp of 9:04.06 on 1/1/00 and a logout timestamp of 17:30.15 on 1/1/00. Information of the duration column 214 may be used to track or monitor for abnormal account access behavior. For example, if Bob from a finance department normally accesses an account from approximately 9 AM to 5 PM on typical work days, then if he is accessing his account at 5 AM then an indicator of possible account compromise can be set. In some embodiments, duration column 214 may be optional.

Resources accessed column 216 can be used to store information associated with the resources accessed by an account. For example, when a user logins from a device, the device, the user, or a combination thereof can trigger access of a network resource including mounting a shared drive (e.g., an engineering drive or a finance drive) or accessing some service (e.g., a video stream service on server). In some embodiments, the information of network resources accessed can be based on accessing data from a domain controller (e.g., Active Directory™) or traffic monitoring (e.g., traffic sniffing, packet analysis, or combination thereof). The network resources accessed can be stored in data structure 200 as associated with the device and the user. Data structure 200 may thus indicate that at a given point in time, User1 was logged into two devices: an accounting shared drive and an AP shared drive.

The security posture column 218 can be used to store one or more security properties or a security posture of a device (e.g., the device associated with the IP address of IP address column 208). For example, the security posture information of security posture column 218 may include operating system and version, applications (e.g., running, installed, or both), and vulnerabilities (e.g., IOC, unpatched vulnerabilities, etc.).

The password change column 220 can be used to store information of the number of times a password has been changed for a particular account. For example, as shown in row 230 of FIG. 2, the password of the account of User1 has been changed on time. In some embodiments, the password change column 220 may be used to track the number of times that a password has been changed within a specified period. For example, the password change column 220 may be used to store information indicating that an account password has been changed six times in the past week, which may indicate that the account has been compromised and the password has been change frequently as part of the account compromise.

The time since a password change may be considered along with other factors in determining whether an account has been compromised. For example, if the account password has been changed and the device that was used to change the password has multiple account access failures to other accounts, the device and account may be determined to have been compromised and the account that has been successfully logged into the device may be disabled. In some embodiments, the password change column 220 may be used to track the frequency of password changes. For example, if a user regularly changes their password at six month intervals and then suddenly the account password is changed multiple times in a short period of time that may be an indication that the account has been compromised.

The tracking of location and other context information enables embodiments to more reliably and accurately report account compromise or hijack events. It is appreciated that other methodologies, e.g., STEM or log based systems and privilege account management systems, do not gather the location and context information necessary to make reliable and accurate reporting of account hijack or compromise events.

Embodiments are further able to control device access to a network based on the detection of account compromise. For example, if a device attempts to log into multiple accounts and fails on each attempt repeatedly, the device may have its network access restricted (e.g., by changing the virtual local area network (VLAN)) to isolate the device.

Embodiments are further able to monitor local account logins which are not tracked by other methodologies including domain servers or STEM systems. For example, local accounts can be a weak point because it is not a network login, e.g., local accounts may not be subject to frequent password policy changes and other password strength requirements. Embodiments are able to monitor local account access (e.g., login to accounts of a particular device) and network account access (e.g., logins to accounts of a network resource or domain). In some embodiments, an agent (e.g., agent 140) can monitor local account access requests and logins on the device (e.g., by running a command or polling) and send information about local account access requests (e.g., login requests) to a monitoring device (e.g., network monitor device 102). In some embodiments, a device may be queried (e.g., using domain credentials and running a command to determine local account access activity) or inspected to determine local account access activity (e.g., local account login requests and account access).

Figure 3:
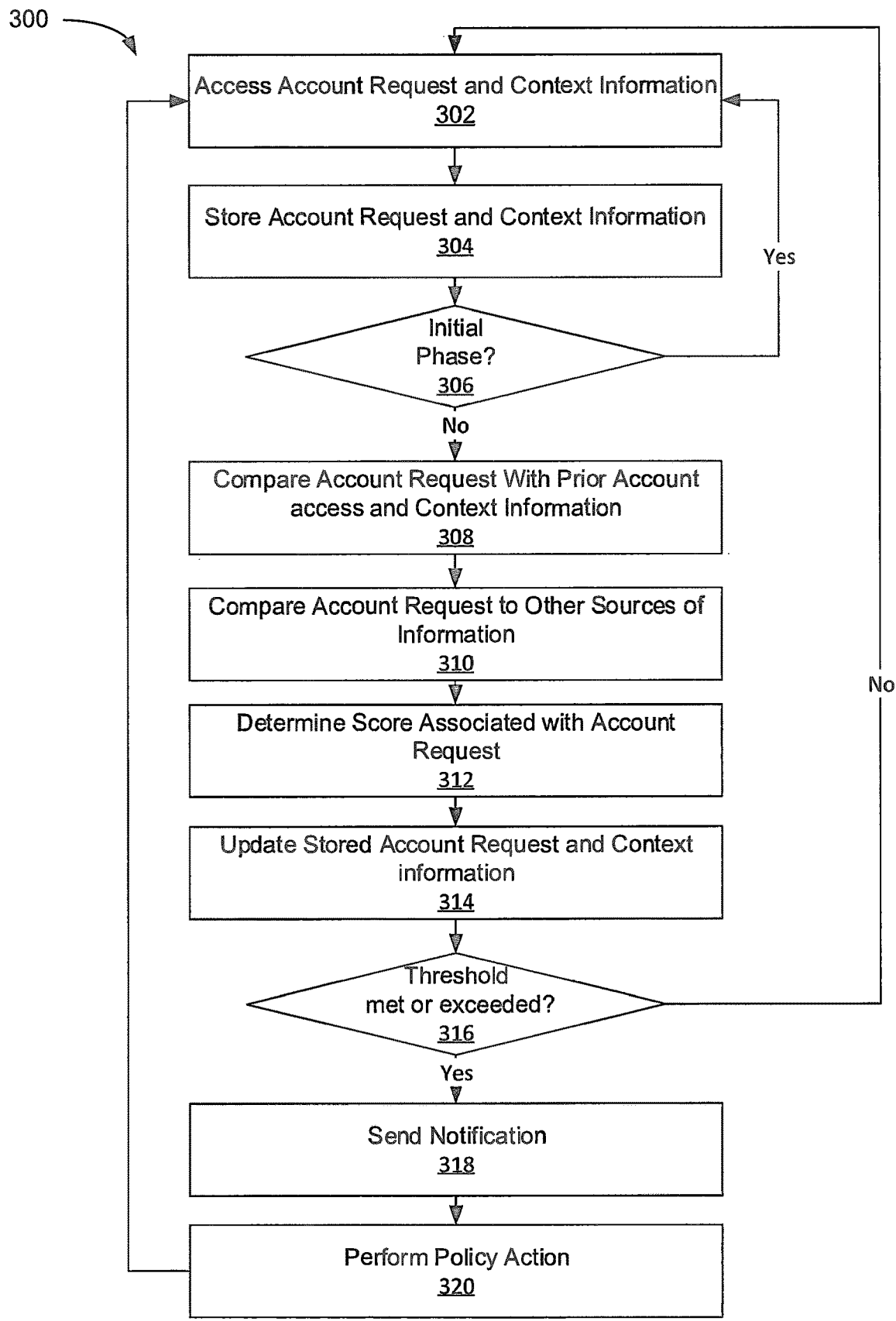
FIG. 3 depicts a flow diagram of aspects of a method for account access monitoring in accordance with one implementation of the present disclosure.

With reference to FIG. 3, flowchart 300 illustrates example functions used by various embodiments. Although specific function blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram 300 of aspects of a method for account access monitoring in accordance with one implementation of the present disclosure. Various portions of flowchart 300 may be performed by different components (e.g., components of system 400) of a device (e.g., network monitor device).

At block 302, account request and context information is accessed. The account request information may be associated with a login request and include a username. The context information can include information associated with the login request including a physical location (e.g., a department, a sub department, a desk, a cube, or a room name of a device or network device coupled to the device), a login duration (e.g., login and logout timestamps), previous login request information (e.g., one or more network resources accessed, indicator of compromise (IOC)), a timestamp associated with the login request, login information entry time (e.g., in milliseconds and may be used to determine if a human or a computer has input the login information), or a combination thereof. The account request information and context information may be accessed from a STEM system (e.g., based on a log), a domain controller, an agent (e.g., executing on the device that send the account request), previously stored data (e.g., data structure 200), or a combination thereof. In some embodiments, the account request information may also be accessed based on packet analysis of network traffic. For example, one or more packets of the login request may be accessed (e.g., based on port mirroring) that are sent between a client and server.

The context information can include the information of data structure 200 including, but not limited to, account or account name, IP address, IP address range, department, sub department, cubical or cube, desk, account access result (e.g., success or failure), duration, resources accessed, one or more security properties or security posture (e.g., operating system, applications, vulnerabilities, etc.), and password change (e.g., over a period or number of times the password has been changed), as described herein. The context information may be accessed from one or more components (e.g., components of system 400) including a component providing NAC functionality. The context information, including, e.g., location, IOC, and security posture, etc., can allow for reduced false positives and more accurate reporting, notifications, and actions in response to a determination of account compromise or possible account compromise.

The account request information and context information may also include device classification information. The device classification information can be used to determine whether the device is a relatively secure, e.g., a Linux™ server, or an IoT device, with minimal security e.g., a cheap drone. The account request information and context information may also include information from probing or scanning the device that sent the account request information. For example, one or more ports of a device may be scanned or probed to determine which ports are open. The results of the scan can be used to determine (e.g., using a database) the protocols and services that are running on the device and therefore whether any services that may have been compromised are running.

At bock 304, the account request and context information is stored. The account request and context information may be stored, e.g., as an update, to a data structure (e.g., data structure 200). For example, the data may be stored as a new row to data structure 200.

At block 306, whether an initial phase is in progress is determined. The initial phase may be used to determine a baseline of activity for one or more accounts and stored in a data structure (e.g., data structure 200). This baseline can be used to study or track the behavior of devices and associated account access. This baseline can be used to compare new login request information to determine whether the login request is abnormal and whether to perform a security action or a policy action. For example, the baseline information may be collected for two weeks before the baseline information is used to determine whether a login request is abnormal or an account may have been possibly compromised. In some embodiments, the initial phase may be performed on an account basis thereby collecting baseline information of certain accounts. For example, baseline information may be collected for new accounts while the initial phase check is not performed for older accounts. This can allow embodiments to use a stored baseline for older accounts while establishing a baseline for new accounts (e.g., an account associated with a new employee).

At block 308, the account request information is compared with prior account access and context information. A portion of the information associated with the login request may be compared with information associated with a previous login request. For example, the account request information may be compared with baseline information (e.g., stored based on blocks 302-306), as described herein. As another example, the time of the login request may be compared to the baseline and whether a human or a device entered the login credentials may be compared to the baseline (e.g., for the account associated with the account request).

At block 310, the account request information is compared with other sources of information. The other sources of information may include a packet analysis component and an external or 3rd party system (e.g., a firewall, threat detection system, etc.). For example, packet analysis or a threat detection system may determine an IOC associated with an IP address of the device that sent the login request. The information from other sources, including, e.g., IOC, compliance information (e.g., based on the security content automation protocol (SCAP)), and security posture, can allow for reduced false positives and more accurate reporting, notifications, and actions in response to possible or actual account compromise. For example, the security posture of a device can indicate that a device is not patched and therefore may be a compromised device. Such information can be treated as quite reliable and when combined with other information, e.g., multiple login failures, which can be used to more accurately report to an account compromise and possibly take action to limit the network access of the device.

At block 312, a score or value associated with the account request or login request is determined. The score can be based on multiple events, multiple factors, or combination thereof. The score may thus be computed dynamically or at run time. In some embodiments, this may be a score calculated based on information associated with the login request and information associated with the account of the login request, the device that sent the login request, and the baseline information associated with the account of the login request (e.g., stored in data structure 200), as described herein. An alert score may be determined based on the information associated with the login request and information associated with the account of the login request, the device that sent the login request, and the baseline information associated with the account of the login request, as described herein, and used to determine whether to send an alert. A security score may be determined based on the information associated with the login request and information associated with the account of the login request, the device that sent the login request, and the baseline information associated with the account of the login request, as described herein, and used to determine whether to send perform a security action.

For example, alert score may be particularly high (e.g., 90 out of 100) for a login request from a device that has an associated IOC and the login request was sent at a time when the account is normally not active (e.g., 3 am when the account is normally active between 9 AM and 5 PM for years). The security score may be particular high (e.g., 100 out of 100) as well based on the IOC and abnormal login request time.

In some embodiments, the score may be expressed as a level, e.g., normal risk level, medium risk level, and elevated risk level. It is noted that as more information is collected and the baseline is more developed, certain activity that may have been scored at a medium risk level may be rerated at a normal risk level. For example, a new employee may have irregular hours at the beginning of their employment or above average number of login failures resulting in a medium risk level and as the time range of their regular hours become more consistent, the hours of being logged in may become associated with a normal risk level.

At block 314, the stored account request and context information is updated based on the account access request (e.g., new login request). The update may further be based on the information accessed based on packet analysis or information received from another system (e.g., IOC information). One or more scores may be added to the stored information (e.g., stored into data structure 200).

In some embodiments, the account request and context information and score information can be stored for use in later determinations of whether an account has been compromised. For example, the score may be computed based on already stored information, e.g., including information associated with previous login requests, and additional information, e.g., an IOC of a device that has just been detected or a patch level of a device that is now too old or low thereby increasing the chances of an account comprise. In other words, some embodiments may accumulate information over time to determine whether an account has been compromised.

At block 316, whether the score meets or exceeds a threshold is determined. The score could be an alert score, a security score, or other type of score, e.g., to record the score but keep for use in future scoring. The threshold may be accessed based on a particular type of score being compared against a particular type of threshold (e.g., an alert threshold for an alert score, a security threshold for a security score). For example, an alert threshold may be accessed and compared against an alert score. As another example, if a device fails a SCAP compliance test and then has 10 successive login failures, this may result in a security score being above the threshold. The threshold may be based on a policy (e.g., user configured) that sets a standard for the scores that result in one or more actions, e.g., notifications, alerts, changes in network access, etc. In some embodiments, the policy may be configured such that multiple actions (e.g., sending of an alert and performing a security action) are performed in response to a score meeting or exceeding the threshold. For example, the network access of a device may be changed or restricted (e.g., by changing VLAN), resources that the device can access may be restricted, a patch service may be initiated on the device, or a combination thereof. In various embodiments, a processing device determines whether to initiate a security action based on the value associated with the login request and the threshold. If the threshold is not met or exceeded, block 302 may be performed. If the threshold is met or exceeded, block 318 is performed.

At block 318, a notification is sent. The notification may be a message sent in the form of an email, text message (e.g., short message service (SMS) message), entry in a database, IT ticket, popup (e.g., on a particular device such as an administrators computer), etc. The notification may include an account name associated with the login request, whether the login information of the request was input by a human or a computer, device information (e.g., classification, IP address, etc.), and other data (e.g., stored in data structure 200).

At block 320, a policy action is performed. The policy action or security action may be performed by a network access control (NAC) component and include initiating or changing the network access (e.g., VLAN) of a device that initiated or sent the login request, initiating an update service with respect to the device (e.g., anti-virus update, patch update, etc.), etc.

The notifications and policy actions may be stored for future access (e.g., in data structure 200). Block 302 may then be performed. It is noted that if the network access of a device is restricted based on the policy action, there may not be further account requests from the device until the one or more network access restrictions are removed.

Figure 4:
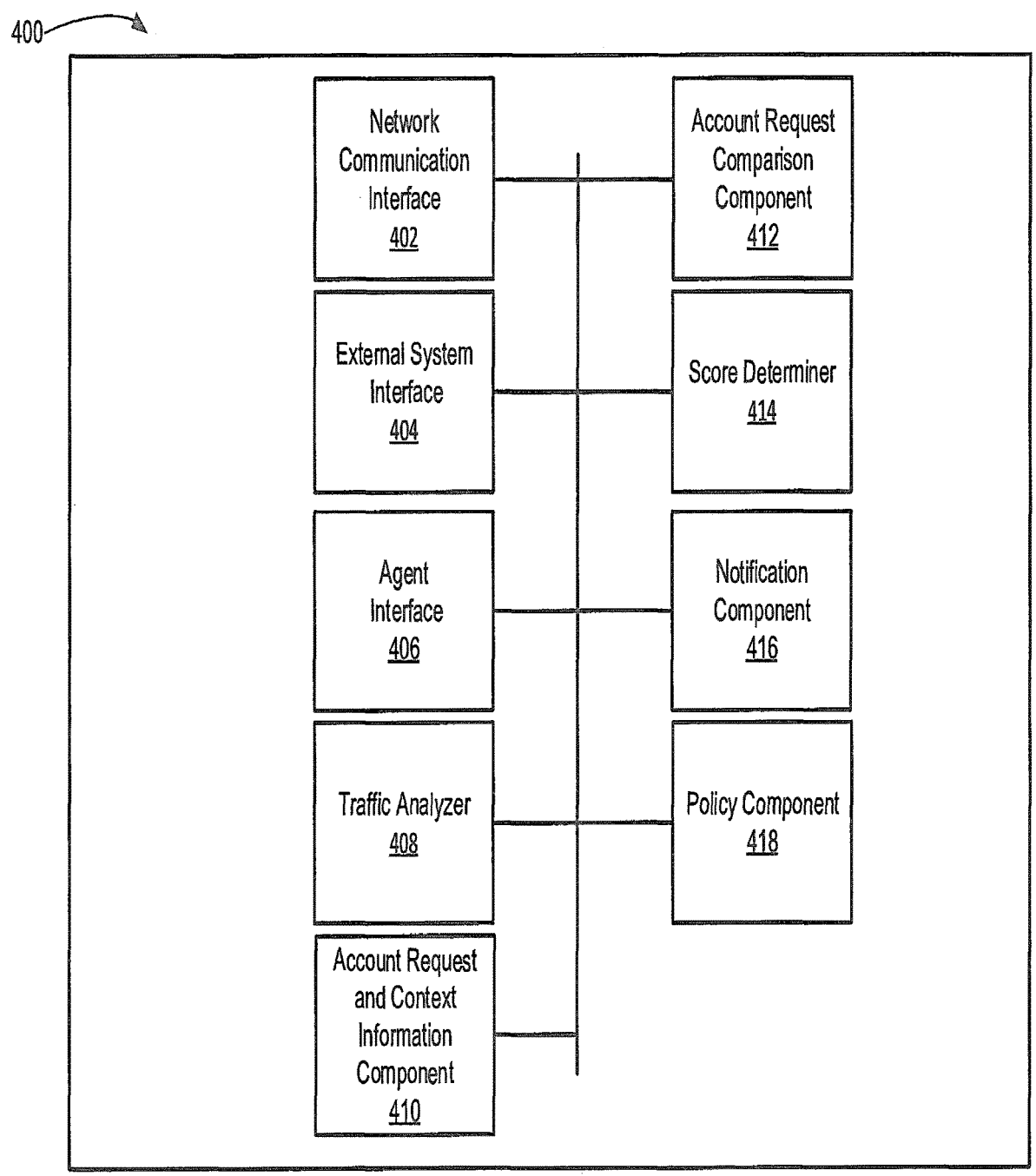
FIG. 4 depicts illustrative components of a system for account access monitoring in accordance with one implementation of the present disclosure.

FIG. 4 illustrates example components used by various embodiments. Although specific components are disclosed in system 400, it should be appreciated that such components are examples. That is, embodiments of the present invention are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system 400 for account access monitoring in accordance with one implementation of the present disclosure. Example system 400 includes a network communication interface 402, an external system interface 404, an agent interface 406, a traffic analyzer 408, an account request and context information component 410, an account request comparison component 412, a score determiner 414, a notification component 416, and a policy component 418. The components of system 400 may be part of a computing system or other electronic device (e.g., network monitor device 102) or a virtual machine and be operable to monitor account access of one or more devices communicatively coupled to a network. For example, the system 400 may further include a memory and a processing device, operatively coupled to the memory, which may perform the functions of or execute the components of system 400. The components of system 400 may access various data associated with a device being monitored in order to determine whether an account has been compromised or hijacked. It is appreciated that the modular nature of system 400 may allow the components to be independent and allow flexibility to enable or disable individual components or to extent/upgrade components without affecting other components thereby providing scalability and extensibility. System 400 may perform one or more blocks of flow diagram 300.

Communication interface 402 is operable to communicate with one or more devices (e.g., network device 104) coupled to a network that are coupled to system 400 and receive or access information about devices coupled to the network, as described herein. The communication interface 402 may be operable to work with one or more components to initiate the monitoring of account access upon a device being coupled to the network.

External system interface 404 is operable to communicate with one or more third party, remote, or external systems to access information about a device to be classified. External system interface 404 may further store the accessed information in a data store (e.g., data structure 200). For example, external system interface 404 may access log information from the third party systems and store the accessed information in the data store. External system interface 404 may be operable to communicate with a vulnerability assessment (VA) system, an advanced threat detection (ATD) system, a mobile device management (MDM) system, a firewall (FW) system, a switch system, an access point (AP) system, etc. External system interface 404 may query a third party system using an API. For example, external system interface 404 may query a firewall for information about a device or for a list of devices that are communicatively coupled to the firewall.

Agent interface 406 is operable to communicate with an agent (e.g., agent 140) of a device that may initiate account access requests which are being monitored. Agent interface 406 can receive or access information gathered by the agent (e.g., information about local accounts, local account login activity, etc.), as described herein.

Traffic analyzer 408 is configured to perform analysis of network traffic (e.g., in real-time) to and from a device being monitored. Traffic analyzer 408 may have a packet engine operable to access packets of network traffic (e.g., passively) and analyze the network traffic. For example, packets associated with login requests may be accessed and analyzed to determine whether a human or a computer is inputting the login information. The traffic analyzer 408 may be configured to perform active or passive traffic analysis or a combination thereof. The traffic analyzer 408 may further be able to access and analyze traffic logs from one or more devices (e.g., network device 104, system 150, or aggregation device 106) or from the device being monitored. The traffic analyzer 408 may further be able to access traffic analysis data associated with the device being monitored, e.g., where the traffic analysis is performed by a third party system.

Account request and context information component 410 is configured to access and manage (e.g., store and update)

account request and context information (e.g., stored in data structure 200), as described herein.

Account request comparison component 412 is configured to compare an account request to previous account request and context information (e.g., in data structure 200), as described herein.

Score determiner 414 may determine one or more scores (e.g., an alert score or a security score) based on information associated with an account login request and context information (e.g., stored in data structure 200), as described herein.

Notification component 416 is operable to initiate a notification based on an alert score meeting or exceeding a threshold, as described herein. The notification may be any of a variety of notifications, e.g., IT ticket, email, SMS, etc., as described herein.

Policy component 418 is operable for initiating or triggering one or more remediation actions, as described herein. Policy component 418 may restrict network access, signal a patch system or service, signal an update system or service, initiate an action to address one or more compliance issues, etc., as described herein. The policy component 418 may thus, among other things, automatically patch, automatically update, and automatically restrict network access of a device.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 400 may be software stored on a non-transitory computer readable medium having instructions encoded thereon that, when executed by a processing device, cause the processing device to: access information associated with a login request. The login request is associated with a physical location. The instructions may further cause the processing device to compare a portion of the information associated with the login request with information associated with a previous login request. The information associated with the login request comprises a login information entry time. The instructions may further cause the processing device to determine a value associated with the login request based on the information associated with the previous login request and access a threshold. The instructions may further cause the processing device to determine whether to initiate a security action based on the value associated with the login request and the threshold and store the information associated with the login request.

In some embodiments, the processing device further to determine whether a device or a human entered login information based on the login information entry time. In various embodiments, the information associated with the previous login request comprises an indicator of compromise (IOC). In some embodiments, the information associated with the previous login request comprises an indicator of a login failure.

Figure 5:
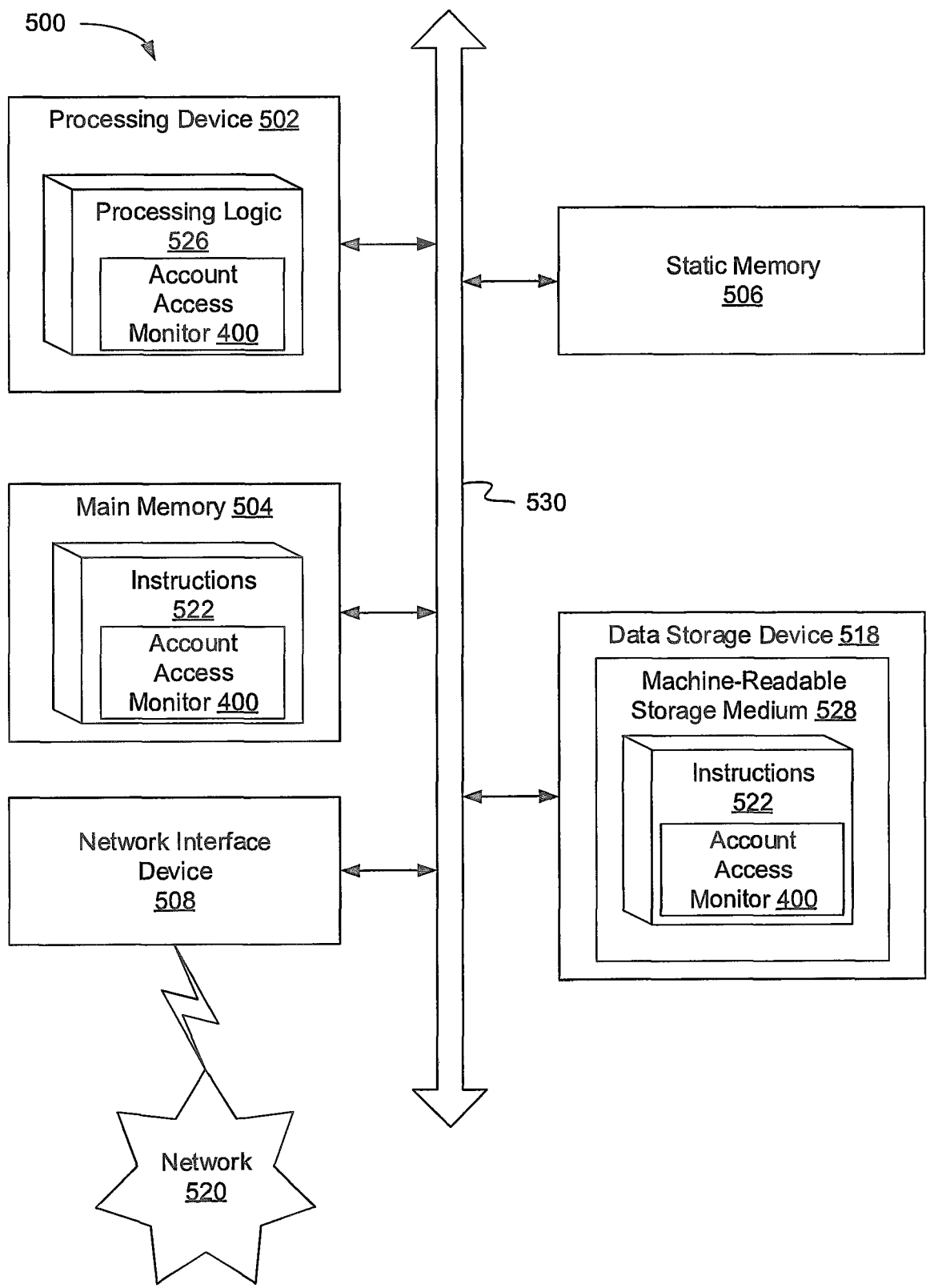
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 configured to perform account access monitoring or system 400.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 400 shown in FIG. 4, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute account access monitor 400. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for monitoring account access, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
accessing information associated with a login request, wherein the login request is associated with a physical location, and wherein the information associated with the login request comprises a login duration;
comparing a portion of the information associated with the login request with baseline information associated with a plurality of previous login requests, wherein the baseline information comprises network addresses, device properties, and security posture of one or more devices associated with the plurality of previous login requests;
determining a score associated with the login request based on the comparing of the information associated with the login request with the baseline information associated with the previous login request and information associated with a device that sent the login request;
accessing a threshold;
determining, by a processing device, whether to initiate a security action based on the score associated with the login request and the threshold; and
storing the information associated with the login request.

2. The method of claim 1, wherein the physical location associated with the login request comprises at least one of a department or a sub department and the physical location is associated with a device that sent the login request.

3. The method of claim 1, wherein the information associated with the login request comprises a timestamp associated with the login request.

4. The method of claim 1, wherein the information associated with the previous login request comprises one or more resources accessed.

5. The method of claim 1, wherein the determining of whether to initiate the security action is performed is based on further information received after the information associated with the login request.

6. The method of claim 1, wherein the security action comprises sending a notification comprising an account name associated with the login request.

7. The method of claim 1, wherein the security action comprises initiating a network access change of a device that sent the login request, and wherein the security action is based on a policy.

8. The method of claim 1, wherein the information associated with the login request is stored with the information associated with the previous login request and the information associated with the login request is operable to be used with subsequently received information to determine whether to initiate the security action.

9. A system comprising:
a memory; and
a processing device, operatively coupled to the memory, to:
    access information associated with a login request, wherein information associated with the login request comprises a physical location, and wherein the information associated with the login request comprises a login duration;
    compare a portion of the information associated with the login request with baseline information associated with a plurality of previous login requests, wherein the information associated with the previous login request comprises a one or more security properties of a device associated with the login request, wherein the baseline information comprises network addresses, device properties, and security posture of one or more devices associated with the plurality of previous login requests;
    determine a score associated with the login request based on the information associated with the previous login request based on the comparing of the information associated with the login request with the baseline information associated with the previous login request and information associated with a device that sent the login request;
    access a threshold;
    determine whether to initiate an action based on the score associated with the login request and the threshold; and
    store the information associated with the login request.

10. The system of claim 9, wherein the physical location associated with the login request comprises at least one of a department, a sub department, or a room name.

11. The system of claim 9, wherein the information associated with the login request comprises a timestamp associated with the login request.

12. The system of claim 9, wherein the information associated with the login request comprises one or more resources accessed by an account of the login request.

13. The system of claim 9, wherein the determining of whether to initiate the security action is performed is based on further information received after the information associated with the login request.

14. The system of claim 9, wherein the score is an alert score and the action comprises sending an alert comprising an account name associated with the login request.

15. The system of claim 9, wherein the score is a security score and the action is a security action comprising initiating a network access change of a device that sent the login request and initiating an update service on the device.

16. A non-transitory computer readable medium having instructions encoded thereon that, when executed by a processing device, cause the processing device to:
    access information associated with a login request, wherein the login request is associated with a physical location, and wherein the information associated with the login request comprises a login duration;
    compare a portion of the information associated with the login request with baseline information associated with a plurality of previous login requests, wherein the information associated with the login request comprises a login information entry time, wherein the baseline information comprises network addresses, device properties, and security posture of one or more devices associated with the plurality of previous login requests;
    determine a score associated with the login request based on the information associated with the previous login request based on the comparing of the information associated with the login request with the baseline information associated with the previous login request and information associated with a device that sent the login request;
    access a threshold;
    determine whether to initiate a security action based on the score associated with the login request and the threshold; and
    store the information associated with the login request.

17. The non-transitory computer readable medium of claim 16, wherein the processing device further to determine whether a device or a human entered login information based on the login information entry time.

18. The non-transitory computer readable medium of claim 16, wherein the information associated with the previous login request comprises an indicator of compromise (IOC).

19. The non-transitory computer readable medium of claim 16, wherein the information associated with the previous login request comprises an indicator of a login failure.

* * * * *